(12) United States Patent  
Feshali

(10) Patent No.: US 12,172,398 B1
(45) Date of Patent: Dec. 24, 2024

(54) PRECISE FABRICATION AND ASSEMBLY OF WAFER-SCALE OPTICAL ELEMENTS

(71) Applicant: Apple Inc., Cupertino, CA (US)

(72) Inventor: Avi Feshali, Sunnyvale, CA (US)

(73) Assignee: APPLE INC., Cupertino, CA (US)

( * ) Notice: Subject to any disclaimer, the term of this patent is extended or adjusted under 35 U.S.C. 154(b) by 1005 days.

(21) Appl. No.: 16/988,814

(22) Filed: Aug. 10, 2020

Related U.S. Application Data

(60) Provisional application No. 62/943,817, filed on Dec. 5, 2019.

(51) Int. Cl.
*B29D 11/00* (2006.01)

(52) U.S. Cl.
CPC .. *B29D 11/00788* (2013.01); *B29D 11/00307* (2013.01)

(58) Field of Classification Search
CPC ........ B29D 11/00788; B29D 11/00307; B29D 11/00; G02B 5/18; G02B 5/1814; G02B 5/1847; G02B 5/1842; G02B 5/1857; G02B 5/1866; G02B 2005/1804; G02B 13/001; G02B 13/0055; G02B 13/0085; G02B 23/243; G02B 7/003; G02B 7/02; G02B 7/021; G02B 7/025; G02B 13/0015; G02B 7/022; G02B 23/16
See application file for complete search history.

(56) References Cited

U.S. PATENT DOCUMENTS

| | | | |
|---|---|---|---|
| 6,243,508 B1 | 6/2001 | Jewell et al. | |
| 6,881,600 B2 * | 4/2005 | Feldman | G02B 6/4206 |
| | | | 438/33 |
| 2008/0068939 A1 * | 3/2008 | Tanaka | G11B 7/0935 |
| | | | 369/44.14 |
| 2013/0120841 A1 | 5/2013 | Shpunt et al. | |
| 2017/0062300 A1 | 3/2017 | Cheng et al. | |
| 2017/0090294 A1 | 3/2017 | Kriman et al. | |
| 2018/0180793 A1 * | 6/2018 | Fattal | G02B 6/0058 |
| 2018/0226514 A1 | 8/2018 | Etschmaier et al. | |
| 2019/0137724 A1 * | 5/2019 | Kim | G02B 7/02 |
| 2019/0187402 A1 * | 6/2019 | Masuzawa | G02B 7/022 |
| 2019/0310541 A1 * | 10/2019 | Zhang | G02B 27/4272 |
| 2021/0311375 A1 * | 10/2021 | Kaiser-Feuerstein | |
| | | | G02B 23/22 |

* cited by examiner

*Primary Examiner* — Stephone B Allen
*Assistant Examiner* — Adam W Booher
(74) *Attorney, Agent, or Firm* — MEITAR PATENTS LTD.

(57) ABSTRACT

A method for optical production includes fabricating an array of optical elements on a transparent planar substrate, the array having opposing first and second surfaces parallel to the planar substrate. For each of the optical elements, a respective housing contains a notch of a predefined width. The first surface of the array is etched so as to form, on each of the optical elements in the array, a respective protrusion having a transverse dimension selected so as to fit into the width of the notch, the second surface of the array is diced through so as to singulate the optical elements. Each of the singulated optical elements is inserted into the respective housing such that the respective protrusion is contained in the notch.

7 Claims, 5 Drawing Sheets

PRECISE FABRICATION AND ASSEMBLY OF WAFER-SCALE OPTICAL ELEMENTS

CROSS-REFERENCE TO RELATED APPLICATION

This application claims the benefit of U.S. Provisional Patent Application 62/943,817, filed Dec. 5, 2019.

FIELD OF THE INVENTION

The present invention relates generally to optical components, and particularly to methods and systems for wafer-scale production of optical elements and assembly of such elements into optical modules.

BACKGROUND

Diffractive optical elements (DOEs) are used in a wide range of optical applications and systems. For example, U.S. Patent Application Publication 2013/0120841 describes the use of DOEs in optical pattern projection. Such DOEs typically contain very fine, precise diffractive structures.

In high-volume applications, DOEs may be replicated in multiple copies onto the surface of a transparent substrate, which is then diced to separate the individual DOEs. For example, U.S. Patent Application Publication 2017/0090294 describes a method for production in which a pattern defining an array of DOEs is transferred from a metal master onto a layer of a transparent, curable polymer that is deposited over a transparent substrate, such as a layer of a suitable epoxy or other resin on a glass or acrylic wafer. Following replication, the substrate is diced so as to singulate the DOEs.

SUMMARY

Embodiments of the present invention that are described hereinbelow provide improved methods for production of optical elements, such as DOEs, as well as devices and modules based on such optical elements.

There is therefore provided, in accordance with an embodiment of the invention, a method for optical production, which includes fabricating an array of optical elements on a transparent planar substrate, the array having opposing first and second surfaces parallel to the planar substrate. For each of the optical elements, a respective housing is provided, containing a notch of a predefined width and shape. The first surface of the array is etched so as to form, on each of the optical elements in the array, a respective protrusion having a transverse dimension selected so as to fit into the width of the notch. The second surface of the array is diced through so as to singulate the optical elements. Each of the singulated optical elements is inserted into the respective housing such that the respective protrusion is contained in the notch.

In a disclosed embodiment, the optical elements include diffractive optical elements (DOEs), which may be fabricated by forming the DOEs on a first transparent wafer, and then bonding a second transparent wafer over the DOEs.

Additionally or alternatively, etching the first surface includes applying a photolithographic process to define the transverse dimension of the protrusion.

In one embodiment, etching the first surface includes applying an isotropic etching process so as to form the protrusion with curved sides, and the notch has a curved shape matching the curved sides of the protrusion. Alternatively, etching the first surface includes applying an anisotropic etching process so as to form the protrusion with rectilinear sides, and the notch has a rectilinear shape matching the rectilinear sides of the protrusion.

In a disclosed embodiment, dicing through the second side of the wafer includes forming dies containing the optical elements, each die including a base having a transverse size greater than the width of the notch, such that the base engages a surface outside the notch within the respective housing. Additionally or alternatively, providing the respective housing includes molding the housing, including the notch of the predefined width. In some embodiments, the method includes inserting a lens assembly into the respective housing in alignment with the singulated optical element.

There is also provided, in accordance with an embodiment of the invention, an optical module, including a housing containing a notch of a predefined width. An optical element, including a transparent material containing an internal patterned layer and having a protrusion over the patterned layer with a transverse dimension selected so as to fit into the width of the notch, is inserted into the housing such that the protrusion is contained in the notch.

In a disclosed embodiment, the optical element is formed by etching a first surface of an array of optical elements fabricated on a transparent planar substrate so as to form the protrusion over the patterned layer, and dicing through the second surface of the array, opposite the first surface so as to singulate the optical element.

In one embodiment, the protrusion has curved sides, and wherein the notch has a curved shape matching the curved sides of the protrusion. Alternatively, the protrusion has rectilinear sides, and wherein the notch has a rectilinear shape matching the rectilinear sides of the protrusion.

The present invention will be more fully understood from the following detailed description of the embodiments thereof, taken together with the drawings in which:

DETAILED DESCRIPTION OF EMBODIMENTS

Figure 1A:
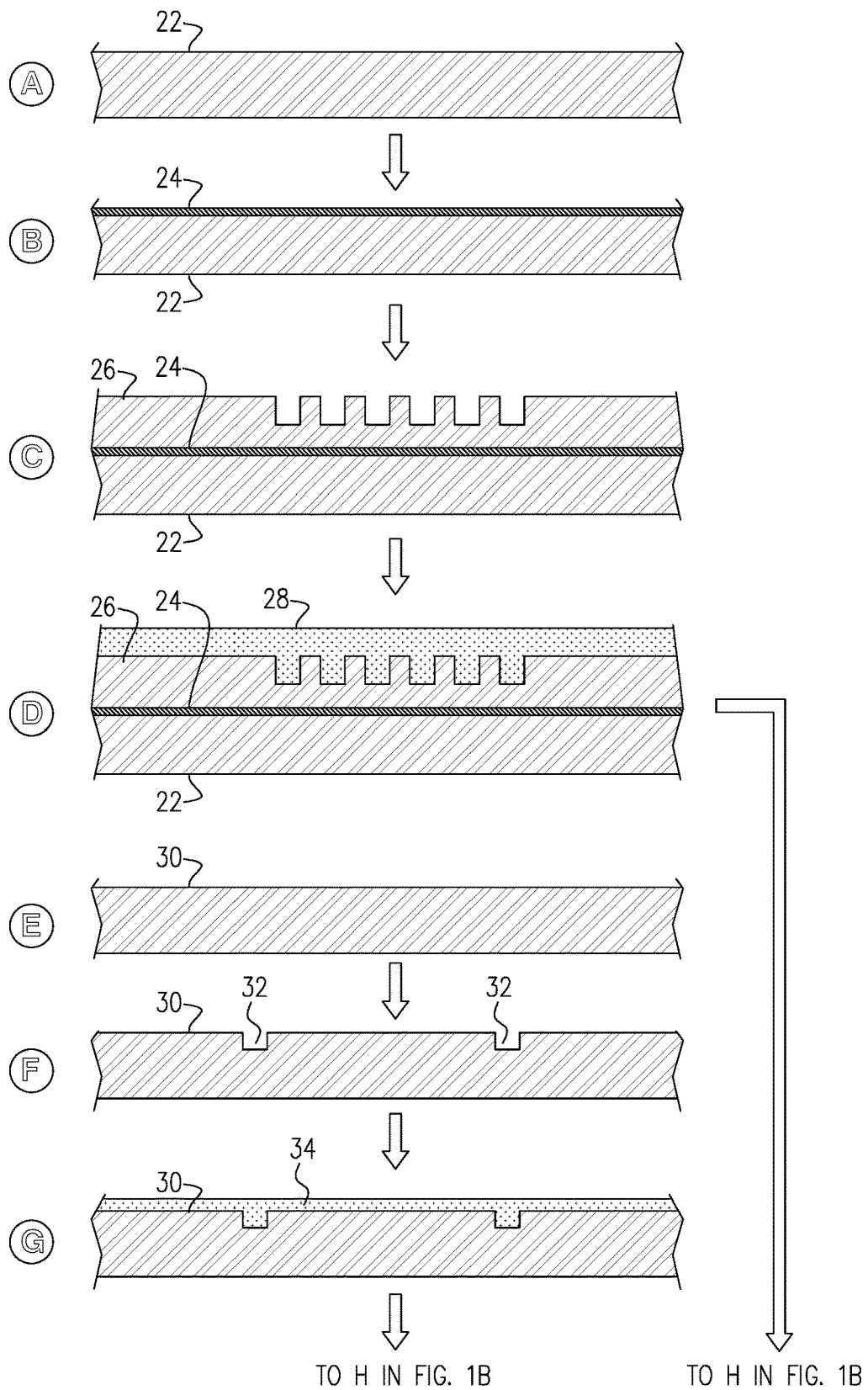
FIGS. 1A and 1B are schematic sectional illustrations showing successive stages in production of a DOE, in accordance with an embodiment of the invention.

Wafer-scale fabrication of optical elements is widely used in mass-production of miniature optical modules, such as cameras and projectors that are incorporated in smart phones and other hand-held devices. Such fabrication techniques can be used, for example, in producing DOEs that are incorporated in depth sensing modules based on pattern projection, such as those described in the above-mentioned U.S. Patent Application Publication 2013/0120841. When a DOE is used for this purpose, a high level of precision is needed in the fabrication and assembly of the depth sensing module, since small shifts and distortion of pattern features can lead to large errors in depth estimation.

In wafer-scale optical fabrication, an array of optical elements (such as DOEs) is formed on a transparent planar substrate, after which the substrate is diced to singulate the elements. Each singulated element is then inserted into and fixed in place within a respective housing. This process is sensitive to inaccuracies in dicing and in positioning of the optical die in the housing, and active alignment may be required in order to position the die properly before fixing it in place. These process inaccuracies tend to increase the cost and/or degrade the quality of modules that are produced in this manner.

Embodiments of the present invention that are described herein address these problems by etching each of the optical elements in the array before dicing, in order to create a shape feature that will fit tightly into a corresponding structure in the housing. These embodiments take advantage of the high precision of wafer-scale etching processes, by comparison with dicing, to ensure that the optical element will fit precisely into place, in proper alignment with the other components in the housing. This tight fit is also useful in creating a good seal between the optical element and the housing, which helps to keep fluid and particulate contaminants out of the module.

In the disclosed embodiments, the housing includes a notch having a certain predefined width. An array of optical elements, such as DOEs, is fabricated on a transparent planar substrate, and a first surface of the array is etched to form a respective protrusion on each of the optical elements in the array. The transverse dimension of the protrusion is selected so as to fit into the notch, with a snug fit. The optical elements are then singulated by dicing through the second, opposing surface of the array. The singulated optical elements are inserted into the housings such that the respective protrusion of each optical element is contained in the notch.

The above-mentioned etching step can use a photolithographic process to define the shape and size of the protrusion that is to be formed. For example, wafer-level photolithography can be used to define the etched dimensions of the protrusion with a precision of $0.1\mu$ or less (in contrast with conventional dicing, which has a precision of tens of microns at best). The notch may be molded to a shape and size that matches the dimensions of the protrusion, and the optical element may be inserted into the notch by a pick and place machine. Alternatively, the housing may also be produced by a photolithographic process when higher precision and fine alignment tolerance are needed. When the notch has a rectilinear shape, i.e., with straight sides, anisotropic etching can be applied to the array of optical elements so that the protrusion has matching rectilinear sides. Alternatively, an isotropic etching process can be used to form a protrusion with curved sides, which will fit into a notch having a matching curved shape. At the dicing stage, the dies may be cut so that each die comprises a base having a transverse size greater than the width of the notch, and the housing can be designed such that the base engages a surface outside the notch within the housing.

Figure 1B:
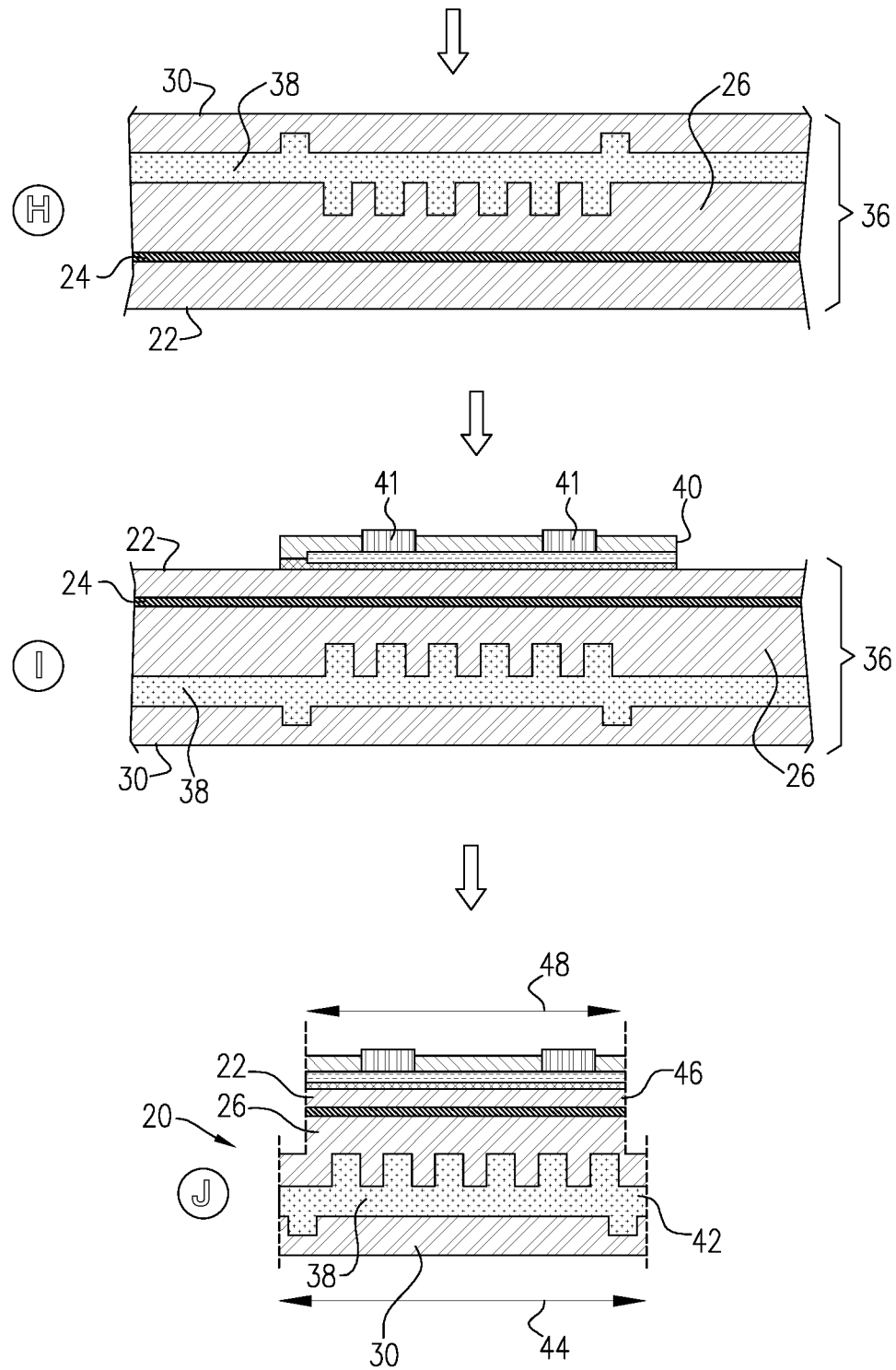

FIGS. 1A-1B are schematic sectional illustrations showing successive stages in production of a DOE 20, in accordance with an embodiment of the invention. The stages are labeled A-J, with stages A-G in shown FIG. 1A and stages H-J in FIG. 1B. DOE 20 in this example is made from two transparent wafers, for example glass or acrylic wafers, which are referred to for convenience as a device wafer 22 (stage A) and a support wafer 30 (stage E). In stages A through I, wafers 22 and 30 are processed and then joined together in order to form an array of DOEs, for example a two-dimensional matrix of DOEs distributed across the area of the wafers. For the sake of simplicity, however, the figures show only a single element of this array. The elements in the array are then singulated to create DOE 20 in stage J.

In stage B, an anti-reflection coating 24 is applied to device wafer 22, and a grating 26 is formed over coating 24 in stage C. Grating 26 may be formed by any suitable process known in the art, such as the replication processes described in the above-mentioned U.S. Patent Application Publication 2017/0090294, for example, or a photolithographic process. A protective transparent layer 28 is then deposited over grating 26 in stage D. Layer 28 may comprise benzocyclobutene (BCB), for example, or any other suitable transparent material with an index of refraction that is substantially different from that of the material in grating 26.

Alignment marks 32 are formed in support wafer 30 in stage F, for example by etching or stamping the wafer. In stage G, a transparent layer 34, typically comprising the same material as layer 28, is deposited over the surface of wafer 30.

Following stages D and G, wafer 30 is bonded over wafer 22 in stage H, to form a combined, transparent planar substrate 36, containing an array of DOEs. Layers 28 and 34 are bonded together to form an internal patterned layer 38, for example a high-index BCB layer, on which the DOE pattern of grating 26 is impressed. Wafer 30 may be thinned at this stage, for example by a suitable chemical and/or mechanical grinding process, followed by polishing if needed. Wafer 22 is similarly thinned in stage I (in which substrate 36 is flipped upside down relative to the orientation shown in stage H). Optionally, additional optical and/or functional layers are deposited over the surface of wafer 22, such as a trace 40 comprising a transparent conductive material, such as indium tin oxide (ITO), with electrical contacts 41.

The upper surface of substrate 36 is etched in stage J to define a protrusion 46 over patterned layer 38, having a transverse dimension 48. (The term "upper" is used arbitrarily to refer to the orientation of substrate 36 that is shown in FIG. 1B is stages I and J; while "transverse" refers to directions parallel to the plane of substrate 36, meaning the horizontal direction in FIGS. 1A/B.) A photolithographic mask can be applied to substrate 36 in order to define transverse dimension 48, followed by an anisotropic etching process to form the rectilinear sides of protrusion 46. For example, a wet etching process may be used at this stage, such as a buffered oxide etch or other process using a hydrofluoric acid etchant. (Wet etching of this sort is advantageous in terms of fast processing speed.) In practice, a matrix of such protrusions is formed over the matrix of gratings within the combined substrate.

After etching protrusions 46, the lower surface of substrate 36 is diced along the indentations between the protrusions in order to singulate the DOEs. As shown in stage J of FIG. 1B, the dicing lines are chosen so that each DOE 20 has a base 42 with a transverse size 44 that is greater than dimension 48.

Figure 2A:
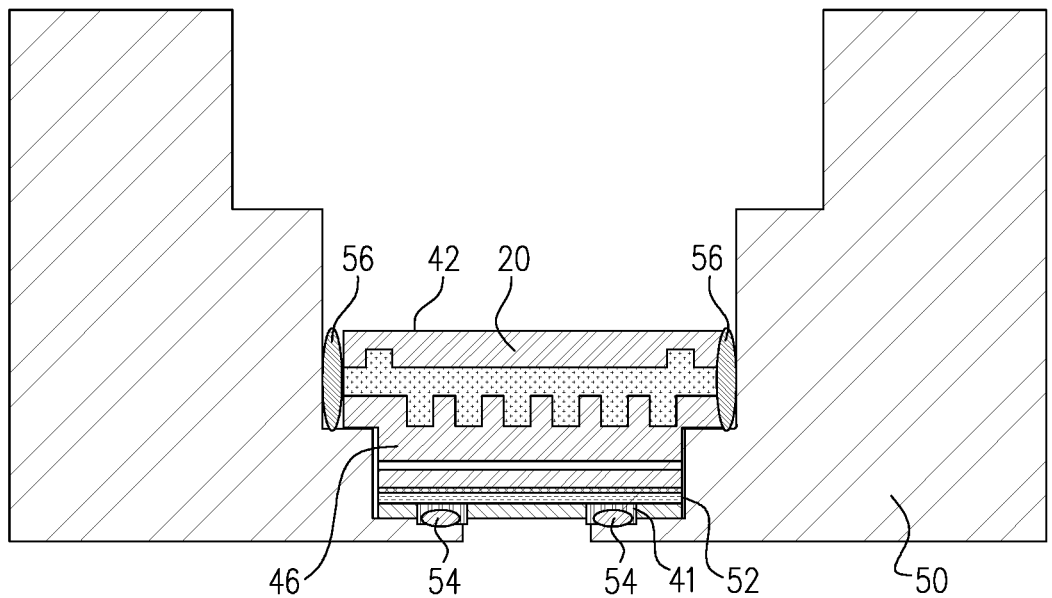
FIGS. 2A and 2B are schematic sectional illustrations showing successive stages in assembly of an optical module containing the DOE of FIG. 1B, in accordance with an embodiment of the invention.
Figure 2B:
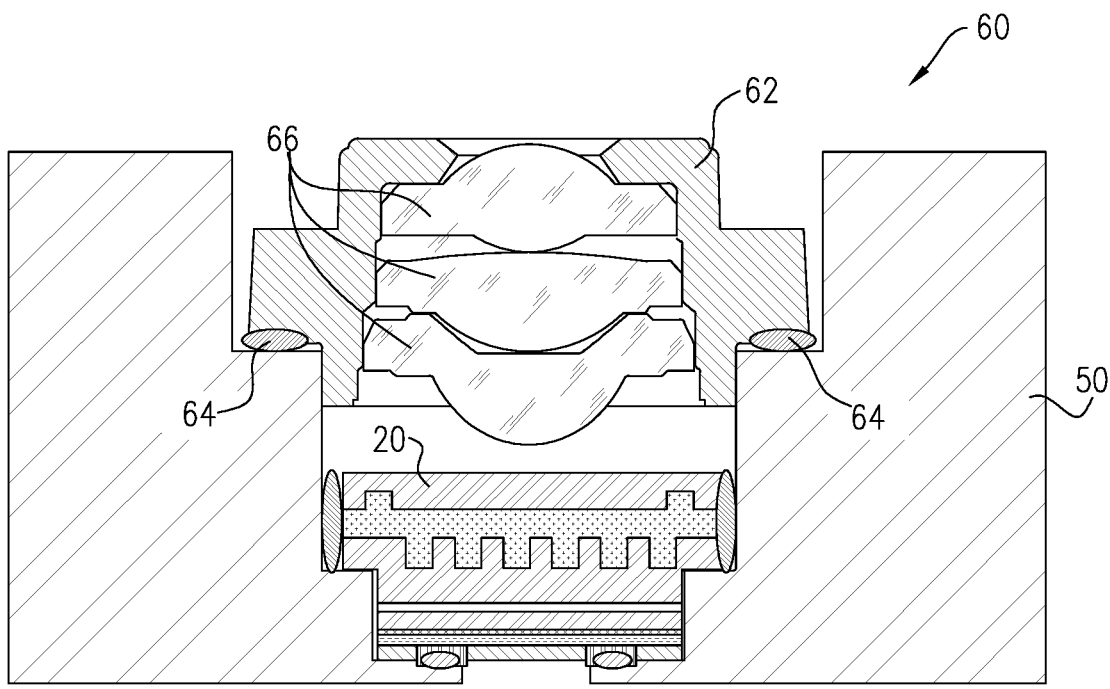

FIGS. 2A and 2B are schematic sectional illustrations showing successive stages in assembly of an optical module 60 containing DOE 20, in accordance with an embodiment of the invention. Module 60 comprises a housing 50, which contains a notch 52 having a rectilinear shape matching the rectilinear sides of protrusion 46 of DOE 20. As noted earlier, housing 50 and DOE 20 are produced so that protrusion 46 fits snugly into notch 52, with little or no play. Housing 50, including notch 52, may be molded to this shape and/or machined. Transverse size 44 of base 42 is greater than the width of notch 52, so that the base engages a surface outside the notch within housing 50 as shown in the figure.

The lower surface of protrusion 46 can be sealed within notch 52 to ensure mechanical stability and to keep contaminants out of housing 50. In the pictured example, contacts 41 on the surface of DOE 20 are electrically and mechanically connected to electrical traces (not shown) in the housing by a suitable conductive adhesive 54, such as a conductive epoxy. Base 42 need not fit into housing 50 as tightly as protrusion 46, and in the pictured example the sides of the base are fastened to the housing by an adhesive 56.

Following the insertion of DOE 20 into housing 50, a lens assembly 62 is inserted into the housing in alignment with the DOE, as shown in FIG. 2B. In the pictured embodiment, lens assembly 62 contains a series of lenses 66 or other refractive elements, and is fixed in place by a suitable adhesive 64. Alternatively, other sorts of optical assemblies, including refractive, diffractive and/or reflective components, for example, as well as functional components, such as radiation sources and/or detectors, may be assembled into the module housing or otherwise aligned with DOE 20 in housing 50. Module 60 as shown here is useful particularly for projection of patterned light, in conjunction with a light source (not shown in the figures) positioned below the module in FIG. 2B; but this module may alternatively be adapted for other purposes.

Figure 3:
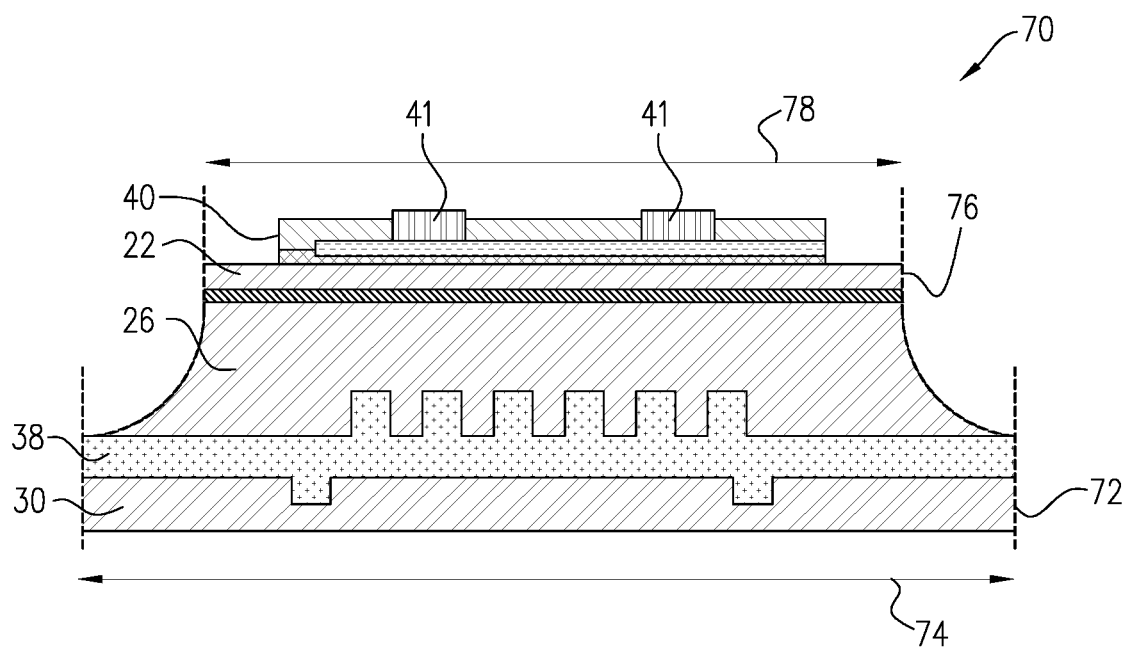
FIG. 3 is a schematic sectional illustration of a DOE, in accordance with another embodiment of the invention.

FIG. 3 is a schematic sectional illustration of a DOE 70, in accordance with another embodiment of the invention. DOE 70 is part of an array of optical elements that are formed on a transparent planar substrate, as in the embodiment of FIGS. 1A/B. In the present embodiment, however, an isotropic etching process is applied to the substrate before dicing, so that DOE 70 has a protrusion 76 over patterned layer 38 with curved sides. For example, a reactive ion etching process may be applied at this stage, using a gas such as SF6 or CF4, with or without oxygen and argon, depending on the photolithographic mask and chamber conditions. Protrusion 76 in this case has a transverse dimension 78, which again may be defined by a photolithographic mask. As in the preceding embodiment, a matrix of such protrusions is typically formed over the matrix of gratings within the combined substrate. After etching protrusions 76, the lower surface of the substrate is diced in order to singulate the DOEs along dicing lines chosen so that each DOE 70 has a base 72 with a transverse size 74 that is greater than dimension 78.

Figure 4A:
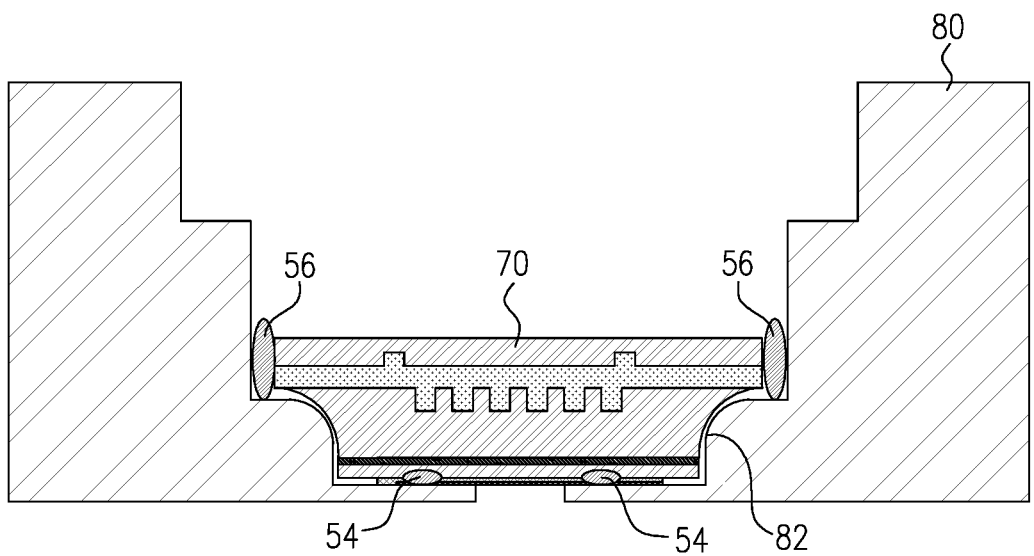
FIGS. 4A and 4B are schematic sectional illustrations showing successive stages in assembly of an optical module containing the DOE of FIG. 3, in accordance with an embodiment of the invention.
Figure 4B:
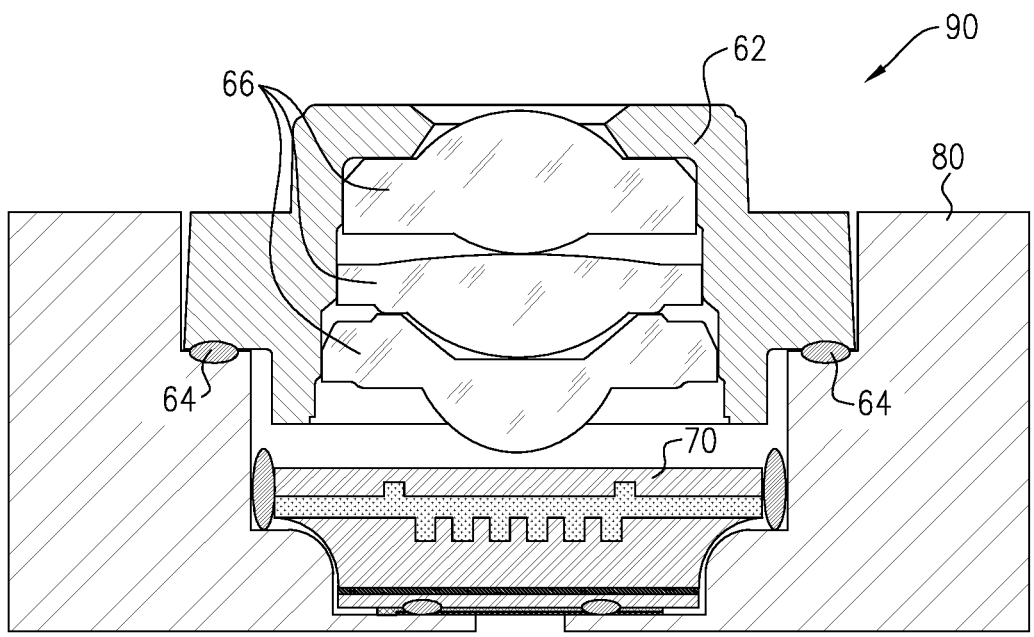

FIGS. 4A and 4B are schematic sectional illustrations showing successive stages in assembly of an optical module 90 containing DOE 70, in accordance with an embodiment of the invention. In this case, module 90 comprises a housing 80, which contains a notch 82 matching the curved sides of protrusion 76 of DOE 70. As in the preceding embodiment, housing 80 and DOE 70 are produced so that protrusion 76 fits snugly into notch 82. Transverse size 74 of base 72 is greater than the width of notch 82, so that the base engages a surface outside the notch within housing 80 as shown in FIG. 4A. Following the insertion of DOE 70 into housing 80, lens assembly 62 is inserted into the housing in alignment with the DOE, as shown in FIG. 4B. Other aspects and components of module 90 are similar to those described in relation to the preceding embodiment.

Although the example embodiments described above relate to specific processes for fabrication of DOEs, the principles of the present invention may similarly be applied in conjunction with other processes for DOE fabrication, as well as in wafer-scale fabrication and assembly of optical elements of other types. These principles may further be applied in assembly of a wide variety of optical modules for various purposes, in addition to the specific module types described above.

It will thus be appreciated that the embodiments described above are cited by way of example, and that the present invention is not limited to what has been particularly shown and described hereinabove. Rather, the scope of the present invention includes both combinations and subcombinations of the various features described hereinabove, as well as variations and modifications thereof which would occur to persons skilled in the art upon reading the foregoing description and which are not disclosed in the prior art.

The invention claimed is:

1. An optical module, comprising:
   a housing containing a notch of a predefined width; and
   an optical element, comprising a transparent material that is cut to define a base containing an internal patterned layer, the base having a predefined transverse size in a first transverse plane that is greater than the width of the notch, and having a protrusion over the patterned layer with a transverse dimension in a second transverse plane selected so as to fit into the width of the notch,
   wherein the protrusion has concave curved sides in a sectional plane perpendicular to the first and second transverse planes, and
   wherein the optical element is inserted into the housing such that the protrusion is contained in the notch, wherein the notch has a convex curved shape matching the concave curved sides of the protrusion, while the base engages a surface outside the notch within the housing.

2. The module according to claim 1, wherein the optical element is formed by etching a first surface of an array of optical elements fabricated on a transparent planar substrate so as to form the protrusion over the patterned layer, and dicing through a second surface of the array, opposite the first surface, so as to singulate the optical element.

3. The module according to claim 2, wherein the optical elements comprise diffractive optical elements (DOEs).

4. The module according to claim 3, wherein the transparent planar substrate comprises a first transparent wafer on which the DOEs are formed, and a second transparent wafer bonded over the DOEs.

5. The module according to claim 1, wherein the transverse dimension of the protrusion is defined by a photolithographic process.

6. The module according to claim 1, wherein the housing is molded, including the notch of the predefined width.

7. The module according to claim 1, and comprising a lens assembly, which is inserted into the housing in alignment with the optical element.

* * * * *